United States Patent
Klein et al.

(10) Patent No.: US 7,944,704 B2
(45) Date of Patent: May 17, 2011

(54) TERMINAL MODULE WITH INTEGRATED FUNCTIONS

(75) Inventors: Harald Klein, Berlin (DE); Adrian Benedetto, Berlin (DE); Antony Nijhuis, Modautal-Brandau (DE); Joachim Stark, Berlin (DE); Manfred Stöckel, Berlin (DE)

(73) Assignee: ADC GmbH, Berlin (DE)

( * ) Notice: Subject to any disclaimer, the term of this patent is extended or adjusted under 35 U.S.C. 154(b) by 339 days.

(21) Appl. No.: 12/088,780

(22) PCT Filed: Sep. 5, 2006

(86) PCT No.: PCT/EP2006/008624
§ 371 (c)(1),
(2), (4) Date: Jul. 29, 2008

(87) PCT Pub. No.: WO2007/039033
PCT Pub. Date: Apr. 12, 2007

(65) Prior Publication Data
US 2008/0285240 A1 Nov. 20, 2008

(30) Foreign Application Priority Data

Sep. 30, 2005 (DE) .................. 10 2005 046 862

(51) Int. Cl.
*H05K 5/00* (2006.01)
(52) U.S. Cl. .................... 361/752; 361/730; 361/807
(58) Field of Classification Search .......... 361/807–810, 361/788, 759, 752, 730, 800, 790, 797, 729; 439/65, 76.2
See application file for complete search history.

(56) References Cited

U.S. PATENT DOCUMENTS

| | | | |
|---|---|---|---|
| 5,481,073 A * | 1/1996 | Singer et al. ................ | 200/1 R |
| 6,373,944 B1 * | 4/2002 | Beavers ...................... | 379/438 |
| 6,577,025 B2 * | 6/2003 | Hentschel et al. ........... | 307/10.1 |
| 7,189,082 B2 * | 3/2007 | Fukushima et al. ......... | 439/76.2 |
| 7,270,551 B2 | 9/2007 | Busse et al. | |
| 7,660,396 B2 | 2/2010 | Witty et al. | |
| 7,760,511 B2 * | 7/2010 | Sasaki et al. ................ | 361/752 |
| 2003/0156389 A1 | 8/2003 | Busse et al. | |
| 2006/0256931 A1 | 11/2006 | Bendig | |
| 2006/0286824 A1 | 12/2006 | Bussse et al. | |

FOREIGN PATENT DOCUMENTS

| | | |
|---|---|---|
| DE | 101 37 219 | 4/2003 |
| DE | 202 03 911 | 8/2003 |

(Continued)

OTHER PUBLICATIONS

BroadWire Plus™; High Density VDSL2 Splitter 24 or 32 Pairs; Jun. 2007; 2 Pages.
BroadWire Plus™; VDSL2 Splitter for 12 Pairs; Jun. 2007; 2 Pages.
BroadWire Plus™; ADSL Splitter for a Single Pair; Feb. 2007; 2 Pages.
BroadWire Plus™; ADSL Splitter for a single Pair; Jul. 2007; 2 Pages.

(Continued)

*Primary Examiner* — Hung S Bui
(74) *Attorney, Agent, or Firm* — Merchant & Gould P.C.

(57) ABSTRACT

The invention relates to a terminal module (1) with integrated functions, comprising a housing (2), at least one terminal strip (14-16) for connecting wire strands, and at least one circuit board (20) which is disposed in the housing (2) and on which functional elements are arranged that are electrically placed between contacts of the terminal strip or strips (14-16). Switching elements (21), by means of which conductor paths between the contacts can be modified, are positioned on the circuit board (20).

16 Claims, 4 Drawing Sheets

FOREIGN PATENT DOCUMENTS

Figure 1:
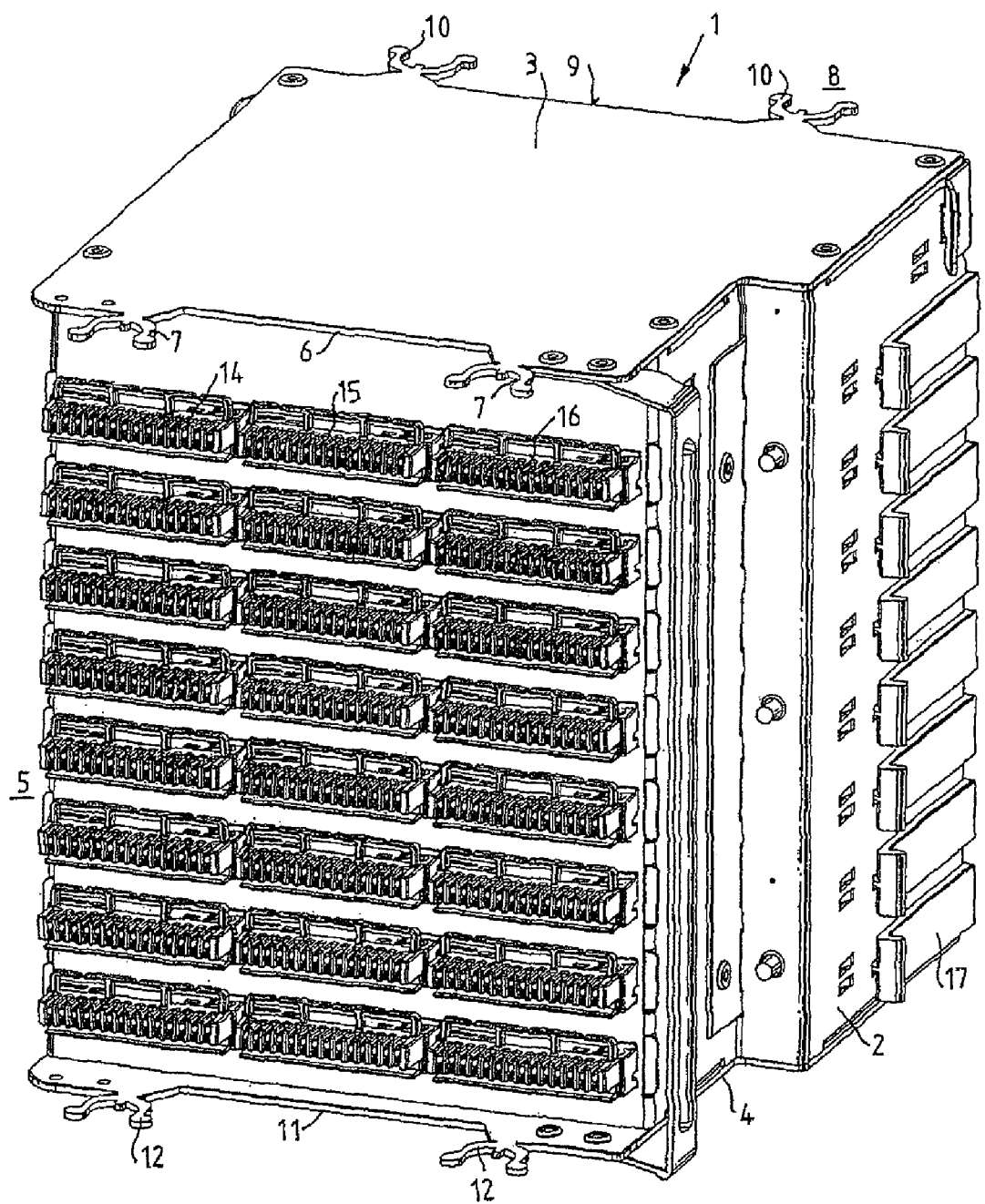

| | | |
|---|---|---|
| WO | WO 99/51019 | 10/1999 |
| WO | WO 01/17219 | 3/2001 |
| WO | WO 01/97339 | 12/2001 |
| WO | WO 03/079599 | 9/2003 |
| DE | 1025 57 308 | 7/2004 |
| EP | 1 381 243 | 6/2003 |

OTHER PUBLICATIONS

VDSL Splitter with LSA-PLUS® Technology; Mar. 2007; 3 Pages.
BroadWire Plus™; DSL Splitter for 12 Pairs; Feb. 2007; 2 Pages.
BroadWire Plus™; ADSL Splitter for 32 Pairs; Feb. 2007; 2 Pages.
BroadWire Plus™; ADSL Splitter for 24 Pairs; Feb. 2007; 2 Pages.

* cited by examiner

TERMINAL MODULE WITH INTEGRATED FUNCTIONS

Such a connector module with integrated functions is known from WO 01/97339. The distribution frame connector module for telecommunication and data technology comprises a housing in which input and output contacts, which are accessible from the outside, are arranged for connecting lines or wires, the housing being constructed with a hollow space in which functional elements are arranged between the input and output contacts. In this arrangement, the functional elements are preferably arranged on at least one circuit board which is supported in the housing. The functional elements are, for example, overvoltage protection elements and filter circuits such as, for example, ADSL splitters. The input and/or output contacts in this arrangement are preferably constructed as plug-in connectors for circuit boards. Such a plug-in connector for circuit boards is known, for example, from DE 10 257 308 B3.

It is also known from WO 99/51019 to plug a DSL splitter into a connector strip by means of a 1DA plug, the splitter then being connected between the subscriber lines and the POTS lines in a similar manner to an overvoltage protection.

The invention is based on the technical problem of improving a connector module with integrated functions in such a manner that a more versatile operation is possible.

For this purpose, switching elements, by means of which circuit paths between the contacts can be varied, are arranged on the circuit board. By this means, the functionality of the connector module can be flexibly altered. The switching elements can be constructed as relays, semiconductor switches or micromechanical components. This is an option particularly if a further active logic is arranged on the circuit board in any case.

In a preferred embodiment, the switching elements are constructed as relays. Relays have high reliability and are an option particularly when further passive components are used, such as, for example, passive filter circuits, which are typical components of splitters.

In a further preferred embodiment, the switching elements are allocated to at least one XDSL module, the XDSL module or modules being arranged on the circuit board and/or constructed as plugs or magazines which can be plugged into the housing. The advantage of the plug-in type of embodiment is user-oriented adaptation. Thus, for example, it is possible to plug in an ADSL plug for POTS or ISDN or a VDSL plug depending on the subscriber's wishes. The plugs are preferably constructed as 1DA plugs. The advantage of integrating the XDSL module on the circuit board is the higher packing density which can be achieved. It is preferably downwardly compatible XDSL modules which are used, so that different XDSL services can be set by means of a single XDSL module.

In a further preferred embodiment, the plug-in plugs can be plugged in via at least one normally-closed contact, the normally-closed contact, without a plug, establishing an electrical connection between subscriber line and POTS line or ISDN line, respectively. This ensures that when the XDSL plug is pulled the normal telephone service is maintained. The normally-closed contacts can be arranged on the circuit board or plugged onto a front end of the circuit board as normally-closed contact module.

In a further preferred embodiment, the housing comprises a multiplicity of circuit boards with switching elements, a central control board, on which at least one processor is arranged, being allocated to the multiplicity of circuit boards. In this arrangement, the control board is connected to the circuit boards with the switching elements via a wiring board or control lines. The processor can then drive the switching elements directly or drive a processor which may be arranged on each circuit board. Apart from the low circuit expenditure, the advantage of having only one central processor is also the lower heat dissipation.

The central control board is preferably constructed with an interface for the voltage supply and/or communication interfaces. The communication interface also preferably comprises an interface to the central network management and a local interface to which, for example, a laptop can be connected.

In a further preferred embodiment, the connector strips for the cable wires are arranged at the front of the housing and the plugs or magazines can be plugged in from the rear.

In a further preferred embodiment, a mechanical guide, in which the plugs and/or magazines are carried, is arranged at the rear of the housing.

In a further preferred embodiment, the housing comprises a cover and/or bottom, ring-shaped contacts being arranged at the front and/or the rear of the cover and/or of the bottom. Via these ring-shaped contacts, the connector module can be mechanically attached to round rods. In a metallic construction of the ring-shaped contact, this can be used as ground terminal at the same time. Some advantages are exhibited, in particular, by the embodiment where there are ring-shaped contacts both at the front and at the rear. Thus, the connector module can first be attached with the ring-shaped contacts at the rear and the cable wires can be comfortably connected in this position. The connector module can then be rotated and attached with the ring-shaped contacts of the front. As a result, the XDSL plugs are freely accessible since usually more patching takes place at these than at the cable wires.

In a further preferred embodiment, a separate connector strip is in each case allocated to the subscriber lines, the POTS lines and the XDSL data lines. This has the advantage that the lines are clearly separated. Furthermore, it also enables prefabricated cables to be used.

In a further preferred embodiment, overvoltage protection elements are arranged on the circuit board, an overvoltage protection also preferably being allocated to the POTS line and/or the subscriber line. In embodiments having only one overvoltage protection, this is preferably allocated to the subscriber line.

Figure 2:
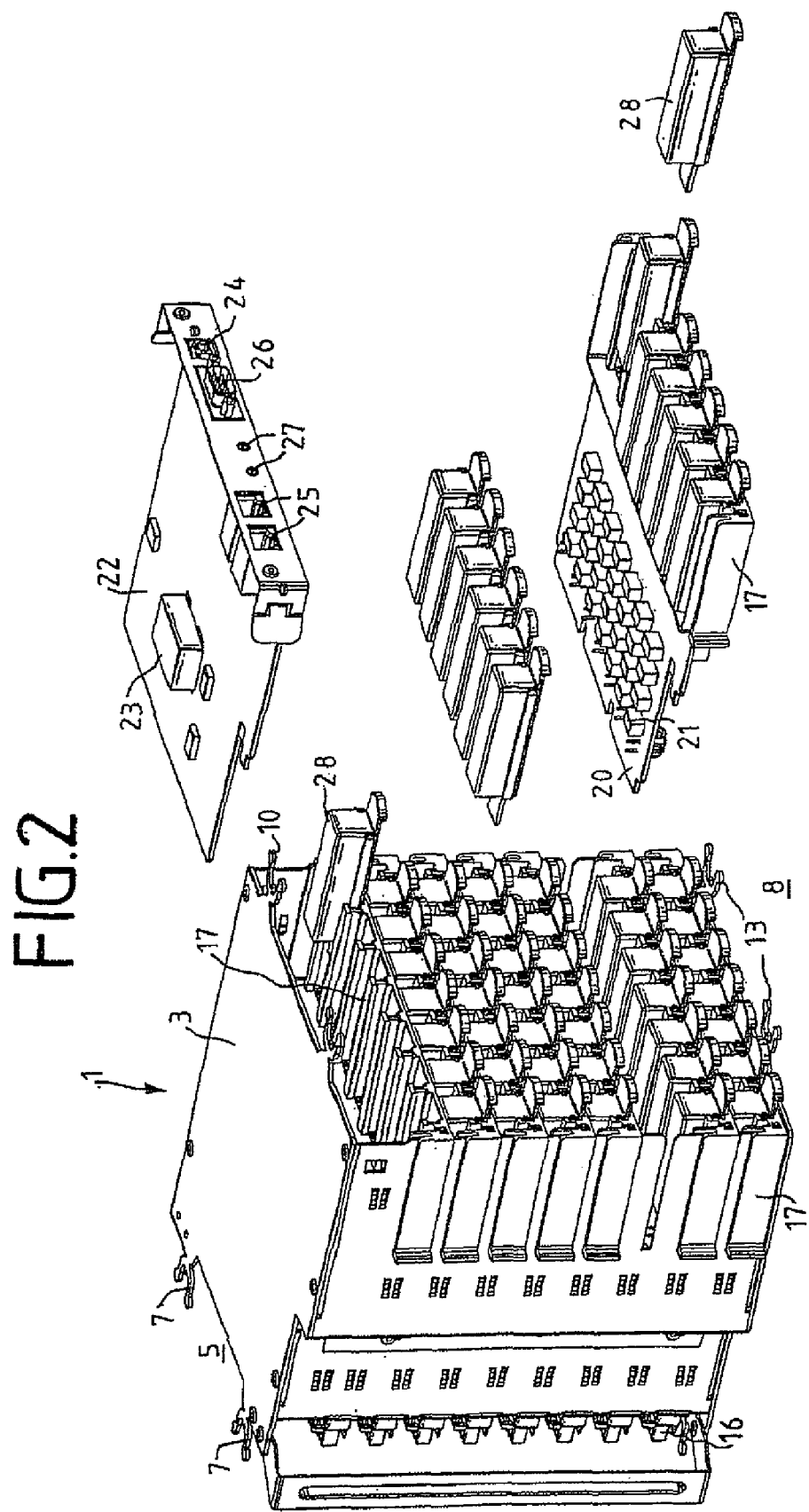
Figure 3:
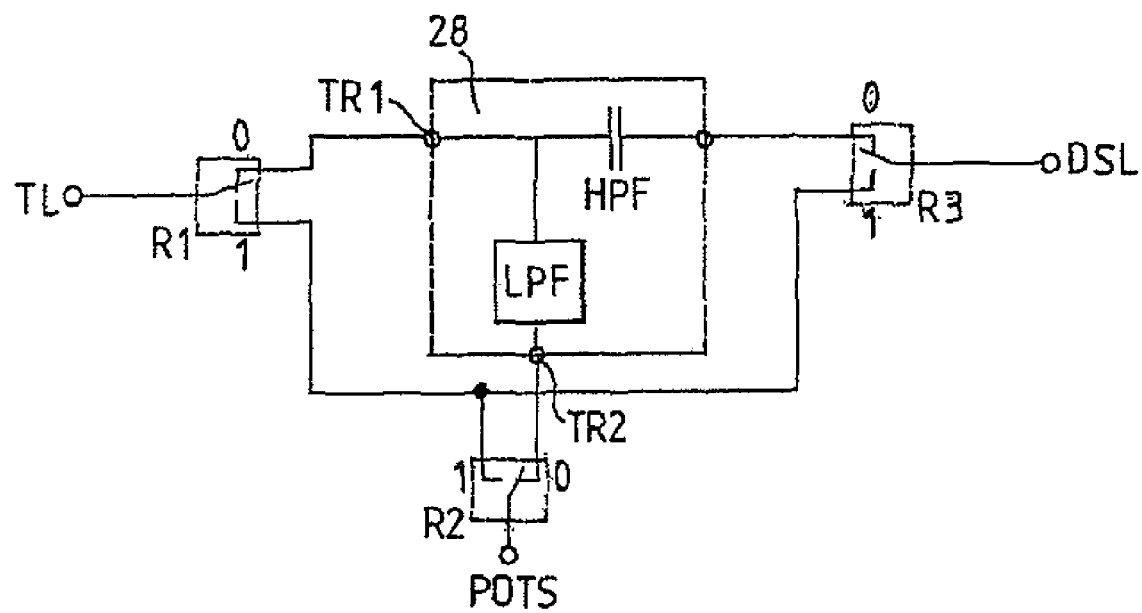
Figure 4:
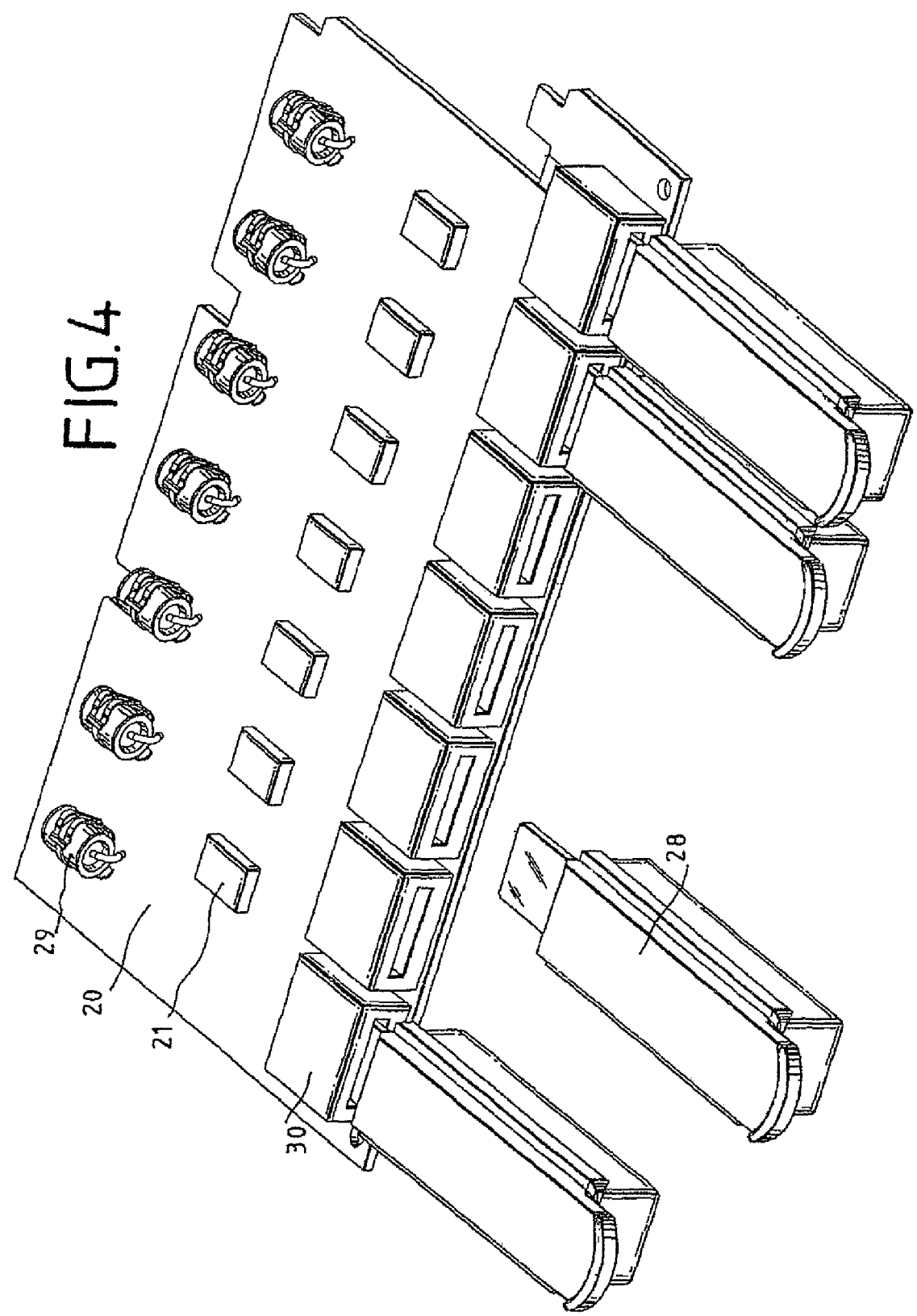

In the text which follows, the invention will be explained in greater detail with reference to a preferred exemplary embodiment. In the figures:

FIG. 1 shows a perspective front view of a connector module in the assembled state, FIG. 2 shows an exploded perspective representation from the rear, FIG. 3 shows a diagrammatic representation of an XDSL module with switching elements, and FIG. 4 shows a diagrammatic representation of a circuit board.

The connector module 1 comprises a housing 2 which is constructed with a cover 3 and a bottom 4. The cover 3 exhibits two ring-shaped contacts 7 at the front end 6 pointing toward the front 5. Similarly, the cover 3 exhibits two ring-shaped contacts 10 at the front 9 pointing toward the rear 8. The bottom 4 exhibits two further ring-shaped contacts 12 at the front end 11 in the direction of the front 5 and two contacts 13 arranged at the rear 8 (see FIG. 2). It can also be seen that the width of the housing 2 is greater at the rear 8 than at the front 5. At the front 5, 24 connector strips for cable wires are arranged. In this arrangement, in each case three connector strips 14, 15, 16 are allocated to one circuit board 20. The left-hand column with connector strips 14 is used for connecting the POTS lines, the center column with connector strips 15 is used for connecting the XDSL data lines and the right-hand column with connector strips 16 is used for connecting the subscriber lines. The connector strips 14 to 16 are constructed as circuit board plug-in connectors and comprise contact elements which exhibit an insulation displacement contact and a forked contact. With regard to the precise construction of the connector strips, reference is made to DE 102 57 308 B3 which is hereby expressly incorporated by reference. On the side in the area of the rear 8, parts of a mechanical guide 17 can also be seen.

As can be seen in FIG. 2, the connector module 1 comprises eight circuit boards 20, on which switching elements 21 in the form of relays are arranged. Furthermore, the connector module 1 comprises a central control board 22 with a processor 23, an interface 24 for the voltage supply with two interfaces 25 for communication with the network management, an interface 26 for local access and signal lamps 27 for status indication. The interface 26 is preferably constructed as RS232 interface for connecting a PC. From the rear 8, the mechanical guides 17 are pushed onto the housing 2, one mechanical guide 17 being allocated to each circuit board 20. The mechanical guides 17 are used for guiding the 1DA-XDSL plugs 28 which are plugged in from the rear 8. In the example shown, seven wire pairs are connected for each circuit board 20. At or on the circuit board 20, normally-closed contacts, not shown, are arranged for looping in the 1DA-XDSL plugs 28. Four normally-closed contacts are preferably allocated to each 1DA-XDSL plug, with two normally-closed contacts being allocated to each wire. One normally-closed contact is located between subscriber line and POTS line, one contact of the normally-closed contact being connected to one contact of the connector strip 14 and the other contact of the normally-closed contact being connected to one contact of the connector strip 16. The other normally-closed contact is exclusively used for looping in the plug 28 at the DSL port. Without 1DA-XDSL plugs 28, the normally-closed contacts are closed and the first normally-closed contact connects the subscriber line to the POTS line. The processor 23 drives the switching elements 21, the central control board 22 being connected to the circuit board 20 via a wiring board for this purpose, with the wiring board being arranged preferably to the side of and perpendicularly to the circuit boards 20.

Using FIG. 3, a preferred exemplary circuit of the switching elements 21 will now be explained. For the sake of clarity, only one circuit path is considered. The points TL, DSL and POTS in each case correspond to one contact point on the circuit board 20, the point TL being connected to one contact of a connector strip 16, the point DSL being connected to one contact of a connector strip 15 and the point POTS being connected to one contact of a connector strip 14. In this arrangement, with each point TL, DSL and POTS, one switching element 21 in the form of a relay R1 to R3 is allocated which in each case can assume two switching positions which are identified by 0 and 1. Furthermore, a 1DA-XDSL plug 28 is plugged in which is an ADSL splitter in the example shown. The ADSL splitter comprises a high-pass filter HPF and a low-pass filter LPF. Between the points TR1 and TR2, a first normally-closed contact is located which is closed without a plug 28. A second normally-closed contact is located at TR3, TR4 and is used for connecting the plug 28 with the DSL port or, respectively, the contacts of the connector strip 15. In the idle state, that is to say all relays R1 to R3 are in position 0 and without a plug 28, the points TL and POTS are then connected. Thus, pure telephony operation takes place. If the plug 28 is then plugged in, the ADSL splitter is interposed and ADSL operation takes place, i.e. the mixed POTS+data signal on the subscriber line is separated by the HPF, LPF filters. The high-frequency DSL signal is then present at the point DSL and the low-frequency POTS signal is present at point POTS. From there, the signals can be then be transferred to a DSLAM or, respectively, a CO switch.

If the user then wishes for SDSL operation, however, relays R1 and R3 are switched into position 1. Relay R2 remains in position 0. As a result, the HPF, LPF filter circuits are short-circuited and pure data traffic takes place between points TL and DSL without having to exchange the plug 28.

If, on the other hand, a line check is to be performed by the Central Office (CO), relays R1 and R2 are switched to position 1 and relay R3 is switched to position 0. Thus, the plug 28 is also short-circuited and the point POTS is directly connected to the point TL. The CO can then perform a low-frequency DC check of the subscriber line. Thus, various circuit paths can be enabled by relays R1 to R3 without pulling or exchanging the plug 28. The overvoltage protection, not shown, is preferably located between the point TL and the relay R1 and/or between the point POTS and the relay R2.

In FIG. 4, a circuit board 20 for seven wire pairs is shown. Apart from the switching elements 21, already explained, triple-pole overvoltage arresters as overvoltage protection elements 29 and normally-closed contact modules 30 can be seen which are arranged on the circuit board 20. The normally-closed contact modules 30 in this case in each case comprise four normally-closed contacts, two normally-closed contacts in each case being allocated to one wire.

LIST OF REFERENCE DESIGNATIONS

1 Connector module
2 Housing
3 Cover
4 Bottom
5 Front
6 Front end
7 Contact
8 Rear
9 Front end
10 Contact
11 Front end
12 Contact
13 Contact
14 Connector strip
15 Connector strip
16 Connector strip
17 Mechanical guide
20 Circuit board
21 Switching element
22 Control board
23 Processor
24 Interface
25 Interface
26 Interface
27 Signal lamps
28 1DA-XDSL plug
29 Overvoltage protection elements
30 Normally-closed contact module

The invention claimed is:
1. A connector module with integrated functions, comprising:
a housing, wherein the housing comprises a cover and a bottom, ring-shaped contacts being arranged at a front and a rear of the cover and of the bottom, at least one connector strip for connecting cable wires and at least one circuit board arranged in the housing, functional elements, which are electrically arranged between contacts of the connector strip or connector strips, being arranged on the circuit board, wherein switching elements are arranged on the circuit board, wherein circuit paths between the contacts are configured to be varied by the switching elements.

2. The connector module as claimed in claim 1, wherein the switching elements are constructed as relays.

3. The connector module as claimed in claim 1, wherein the switching elements are allocated to at least one XDSL module, the XDSL module or modules being constructed as plugs or magazines which are configured to be plugged into the housing.

4. The connector module as claimed in claim 3, wherein the plugs are configured to be plugged into the housing via at least one normally-closed contact, the normally-closed contact, without a plug, establishing an electrical connection between a subscriber line and a POTS line.

5. The connector module as claimed in claim 3, wherein the connector strips are arranged at the front of the housing and the plugs or magazines are plugged in from the rear.

6. The connector module as claimed in claim 5, wherein at least one mechanical guide, in which the plugs and/or magazines are carried, is arranged at the rear of the housing.

7. The connector module as claimed in claim 3, wherein a separate connector strip is allocated to each of a plurality of subscriber lines, each of a plurality of POTS lines and each of a plurality of XDSL data lines.

8. The connector module as claimed in claim 1, wherein the housing comprises a multiplicity of circuit boards with switching elements, a central control board, on which at least one processor is arranged, being allocated to the multiplicity of circuit boards.

9. The connector module as claimed in claim 8, wherein the control board is constructed with an interface for a voltage supply and/or communication interfaces.

10. The connector module as claimed in claim 1, wherein overvoltage protection elements are arranged on the circuit board.

11. The connector module as claimed in claim 10, wherein an overvoltage protection element is allocated to a subscriber line and/or a POTS line.

12. A connector module with integrated functions, comprising:

a housing having a front and a rear, at least one connector strip for connecting cable wires and at least one circuit board arranged in the housing, functional elements, which are electrically arranged between contacts of the connector strip or connector strips, being arranged on the circuit board, wherein switching elements are arranged on the circuit board, wherein circuit paths between the contacts are configured to be varied by the switching elements;

wherein the switching elements are allocated to at least one XDSL module, the XDSL module or modules being constructed as plugs or magazines which are configured to be plugged into the housing.

13. The connector module as claimed in claim 12, wherein the plugs are configured to be plugged into the housing via at least one normally-closed contact, the normally-closed contact, without a plug, establishing an electrical connection between a subscriber line and a POTS line.

14. The connector module as claimed in claim 12, wherein the connector strips are arranged at the front of the housing and the plugs or magazines are plugged in from the rear.

15. The connector module as claimed in claim 14, wherein at least one mechanical guide, in which the plugs and/or magazines are carried, is arranged at the rear of the housing.

16. The connector module as claimed in claim 12, wherein a separate connector strip is allocated to each of a plurality of subscriber lines, each of a plurality of POTS lines and each of a plurality of XDSL data lines.

* * * * *